United States Patent [19]

Darr

[11] Patent No.: US 6,192,086 B1
[45] Date of Patent: Feb. 20, 2001

[54] DIGITAL SUB-SYSTEMS AND BUILDING BLOCKS FOR A MOSTLY DIGITAL LOW-COST BTSC COMPATIBLE ENCODER

[75] Inventor: Roger Darr, Sugar Hill, GA (US)

[73] Assignee: Antec Corporation, Duluth, GA (US)

[*] Notice: Under 35 U.S.C. 154(b), the term of this patent shall be extended for 0 days.

[21] Appl. No.: 09/483,447

[22] Filed: Jan. 14, 2000

Related U.S. Application Data

[63] Continuation-in-part of application No. 09/342,803, filed on Jun. 29, 1999.
[60] Provisional application No. 60/115,917, filed on Jan. 14, 1999.

[51] Int. Cl.[7] ................................................ H04L 27/04
[52] U.S. Cl. .......................... 375/295; 375/376; 381/1; 348/481
[58] Field of Search .................................... 375/295, 229, 375/232, 376; 348/481, 540, 485, 613; 381/1, 2; 455/43

[56] References Cited

U.S. PATENT DOCUMENTS 4,561,012 * 12/1985 Acampora ............................ 348/613
5,796,842 * 8/1998 Hanna .................................. 348/481
6,037,993 * 3/2000 Easley .................................... 381/2

OTHER PUBLICATIONS

Roger Darr, "Designing Low–Cost Digital BTSC Stereo Encoders for Consumer Video Source Equipment," IEEE Eectronic System Product, 2000, pp3 40–341.*

* cited by examiner

Primary Examiner—Tesfaldet Booure

[57] ABSTRACT

A BTSC-compatible encoder that is integrated onto an application specific integrated circuit includes a low pass filter that is responsive to a digital representation of an audio signal that has a sample rate of $F_S$. The low pass filter generates a corresponding second digital signal having an pseudo-interpolated sampling rate of $4F_S$. A digital infinite impulse response pre-emphasis filter generates a pre-emphasized output signal corresponding to the second digital signal. A digital signal compressor that is responsive to the pre-emphasized output signal, generates a compressed digital signal corresponding to the pre-emphasized output signal. A digital phase locked loop that is responsive to a video sync pulse having a sync pulse frequency, generates a third digital signal corresponding to a sinusoid having a frequency equal to twice the sync pulse frequency and a having a sampling frequency equal to $4F_S$. A first digital multiplier multiplies the compressed digital signal by the third digital signal, thereby generating a digital BTSC-compatible stereo television difference signal.

4 Claims, 5 Drawing Sheets

DIGITAL SUB-SYSTEMS AND BUILDING BLOCKS FOR A MOSTLY DIGITAL LOW-COST BTSC COMPATIBLE ENCODER

CROSS-REFERENCE TO PROVISIONAL APPLICATION

This application claims priority under 35 U.S.C. § 119(e) on provisional patent application Ser. No. 60/115,917, filed on Jan. 14, 1999.

CROSS-REFERENCE TO RELATED APPLICATION

This application is a continuation-in-part of copending patent application Ser. No. 09/342,803, filed on Jun. 29, 1999, the disclosure for which is incorporated herein by reference.

BACKGROUND OF THE INVENTION

1. Field of the Invention

The present invention relates to communications systems and, more specifically, to communications systems employing the BTSC standard.

2. Description of the Prior Art

BTSC-compatible encoders are used to encode stereo audio signals into television signals. Existing systems typically use an analog approach. The analog approach is environmentally sensitive and requires extra circuitry to be compatible with digital television systems.

Existing digital BTSC-compatible encoders are embodied on existing digital signal processing (DSP) chips. Such DSP chips are costly relative to application specific integrated circuits when mass produced.

Therefore, there is a need for a digital BTSC-compatible encoder circuit embodied in an application specific integrated circuit.

SUMMARY OF THE INVENTION

The disadvantages of the prior art are overcome by the present invention, which in one aspect is a BTSC encoder that is integrated onto an application specific integrated circuit. The encoder includes a low pass filter that is responsive to a digital representation of an audio signal that has a sample rate of $F_S$. The low pass filter generates a corresponding second digital signal having an pseudo-interpolated sampling rate of $4F_S$. A digital infinite impulse response pre-emphasis filter generates a pre-emphasized output signal corresponding to the second digital signal. A digital signal compressor that is responsive to the pre-emphasized output signal, generates a compressed digital signal corresponding to the pre-emphasized output signal. A digital phase locked loop that is responsive to a video sync pulse having a sync pulse frequency, generates a third digital signal corresponding to a sinusoid having a frequency equal to twice the sync pulse frequency and a having a sampling frequency equal to $4F_S$. A first digital multiplier multiplies the compressed digital signal by the third digital signal, thereby generating a BTSC digital signal.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
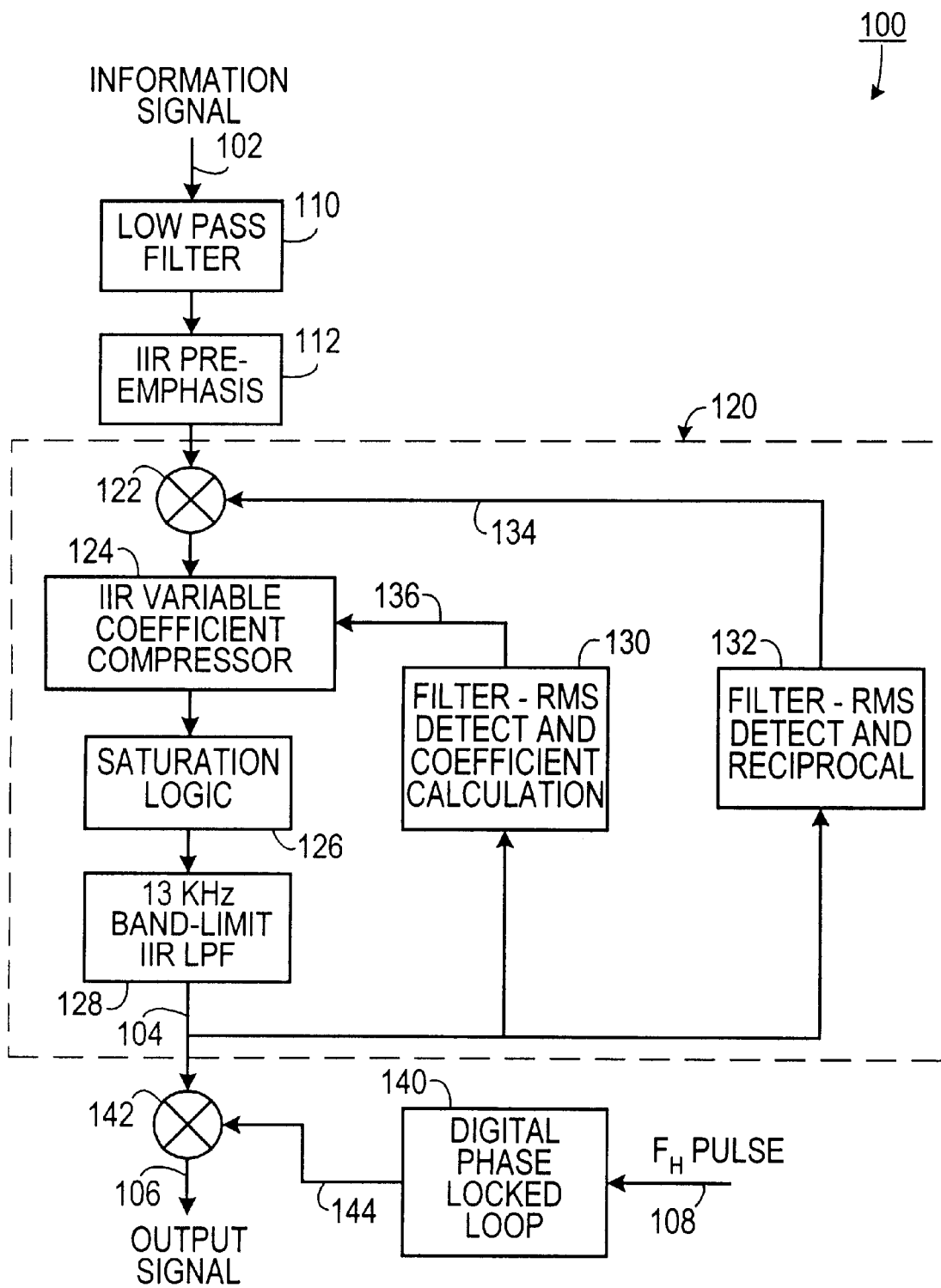
FIG. 1 is a schematic diagram of a BTSC-compatible encoder according to one embodiment of the invention.

A preferred embodiment of the invention is now described in detail. Referring to the drawings, like numbers indicate like parts throughout the views. As used herein a digital BTSC-compatible stereo television difference signal is a digital stereo signal that can be decoded by a decoder that complies with the BTSC stereo television standard.

As shown in FIG. 1, in one illustrative embodiment of the invention, the BTSC-compatible encoder is an application specific integrated circuit 100 in which a low pass filter 110 receives a digital representation 102 of an audio signal having a sample rate of $F_S$. The audio signal could include both left and right components or it could include sum and difference components, depending upon the specific application. The low pass filter 110 generates a corresponding second digital signal having an pseudo-interpolated sampling rate of $4F_S$. A digital infinite impulse response pre-emphasis filter 112 generates a pre-emphasized output signal corresponding to the second digital signal, in accordance with the BTSC standard. A digital signal compressor 120 receives the pre-emphasized output signal and generates a compressed digital difference signal 104.

Figure 3:
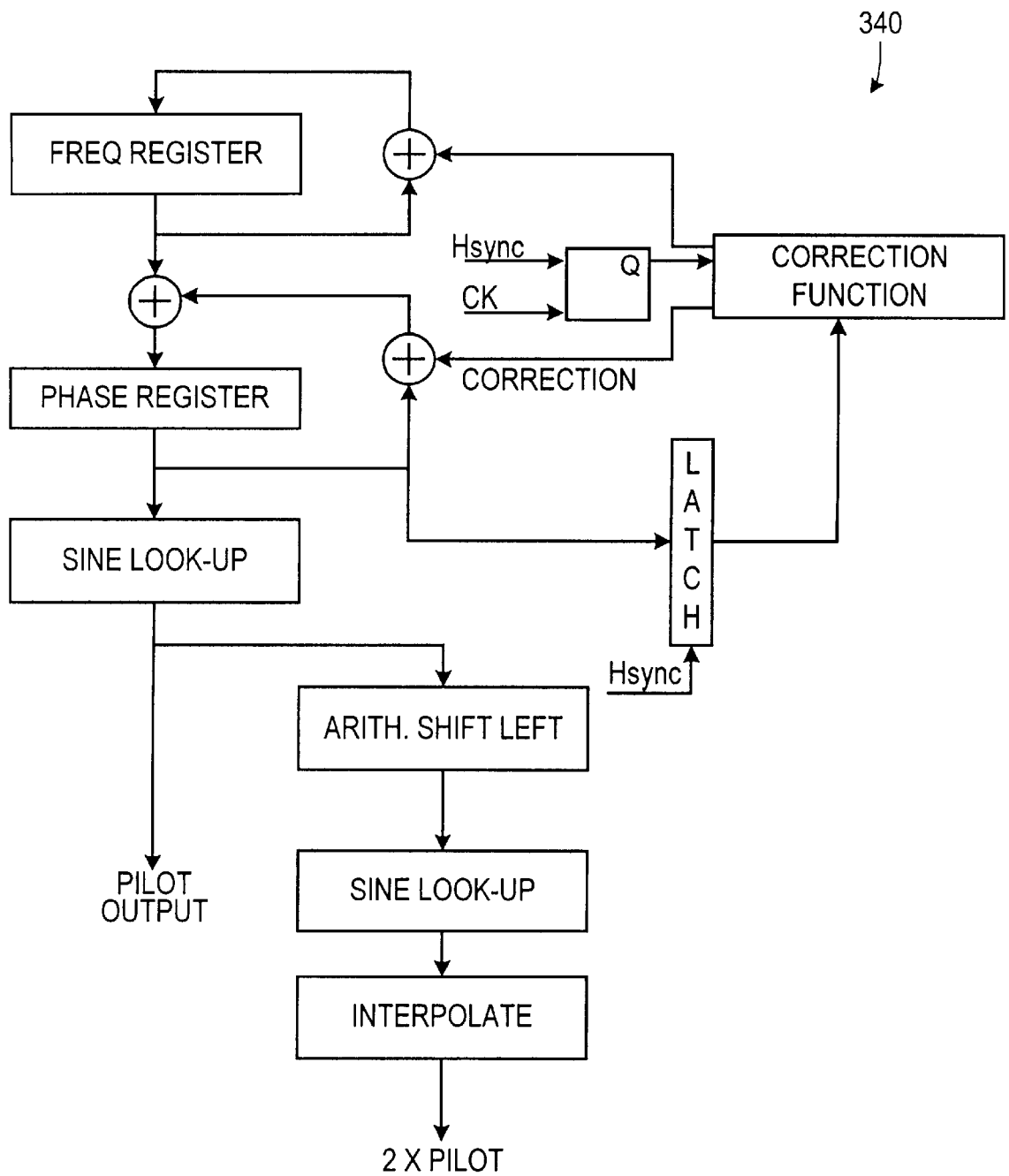
FIG. 3 is a schematic diagram of a digital phase locked loop employed in the embodiment of FIG. 1.

A digital phase locked loop 140 that is responsive to a video sync pulse 108 having a sync pulse frequency ($F_H$) generates a third digital signal 144 corresponding to a sinusoid having a frequency equal to twice the sync pulse frequency and a having a sampling frequency equal to $4F_S$. A first digital multiplier 142 multiplies the compressed digital signal 104 by the third digital signal 144 to generate a digital BTSC-compatible stereo television difference signal 106. One embodiment 340 of the digital phase locked loop 140 is shown in FIG. 3.

Figure 2:
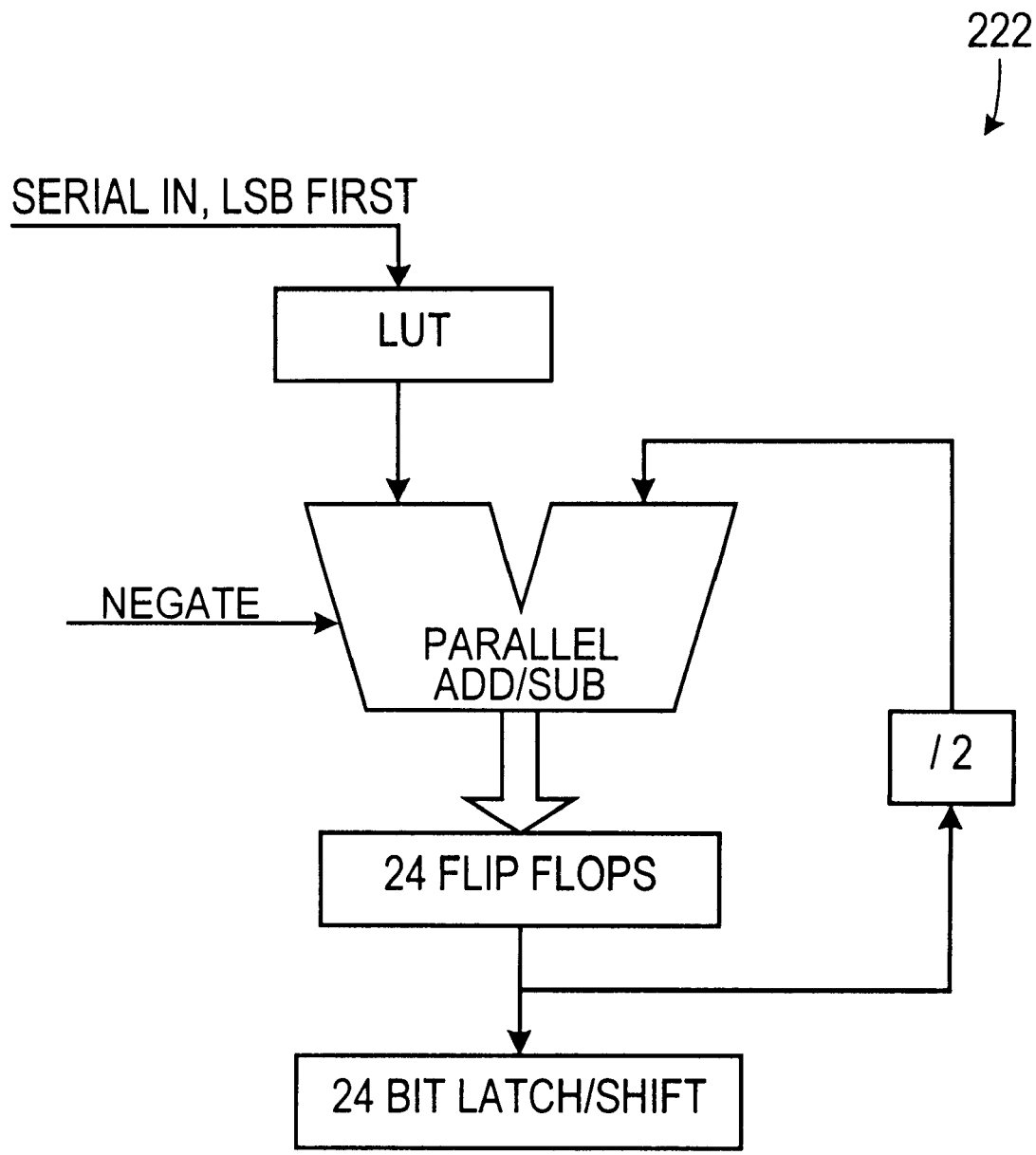
FIG. 2 is a schematic diagram of a serial multiplier employed in the embodiment of FIG. 1.

Returning to FIG. 1, the digital signal compressor 120 includes a second digital multiplier 122 that multiplies the pre-emphasized output signal by a first feedback signal 134, thereby generating a digital feedback-multiplied signal. (The multiplier could be a serial multiplier 222 of the type shown in FIG. 2.) An infinite impulse response variable coefficient compressor 124, that is responsive to the feedback-multiplied signal and responsive to a digital coefficient feedback signal 136, generates a digital dynamic range-limited signal corresponding to the feedback-multiplied signal limited to a predetermined dynamic range. Essentially, the infinite impulse response variable coefficient compressor 124 narrows the dynamic range of the feedback-multiplied signal. A saturation logic circuit 126 generates a digital amplitude-limited signal corresponding to the digital dynamic range-limited signal limited to a predetermined amplitude range. A digital band-limited infinite impulse response low pass filter 128, that is responsive to the amplitude-limited signal, generates a digital band-limited signal corresponding to the amplitude-limited signal that serves as the compressed digital difference signal 104. In the disclosed embodiment, the digital band-limited infinite impulse response low pass filter 128 cuts off signals above 13 KHz, thereby eliminating certain harmonics.

Figure 4:
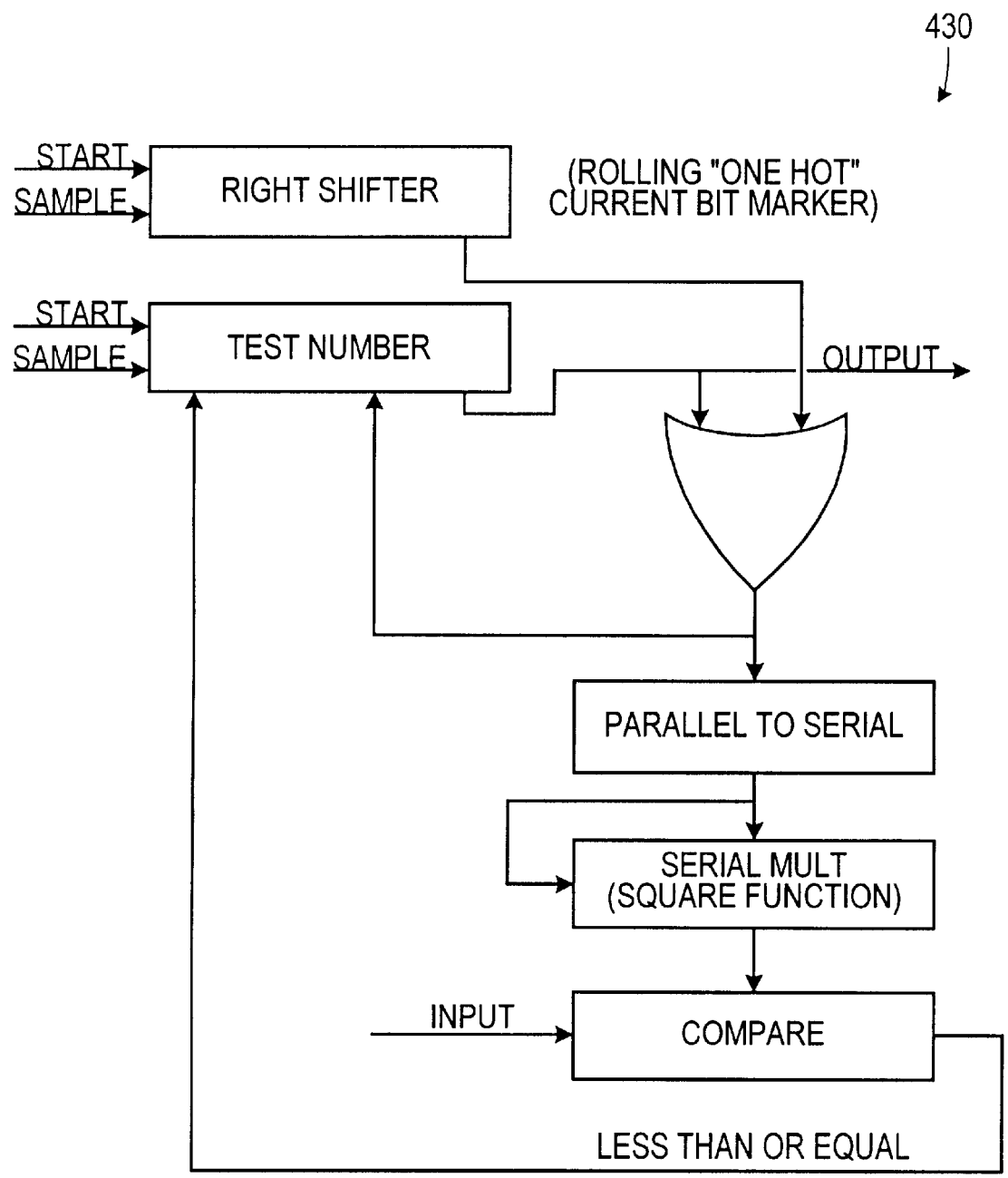
FIG. 4 is a schematic diagram of a positive square root finder employed in the embodiment of FIG. 1.
Figure 5:
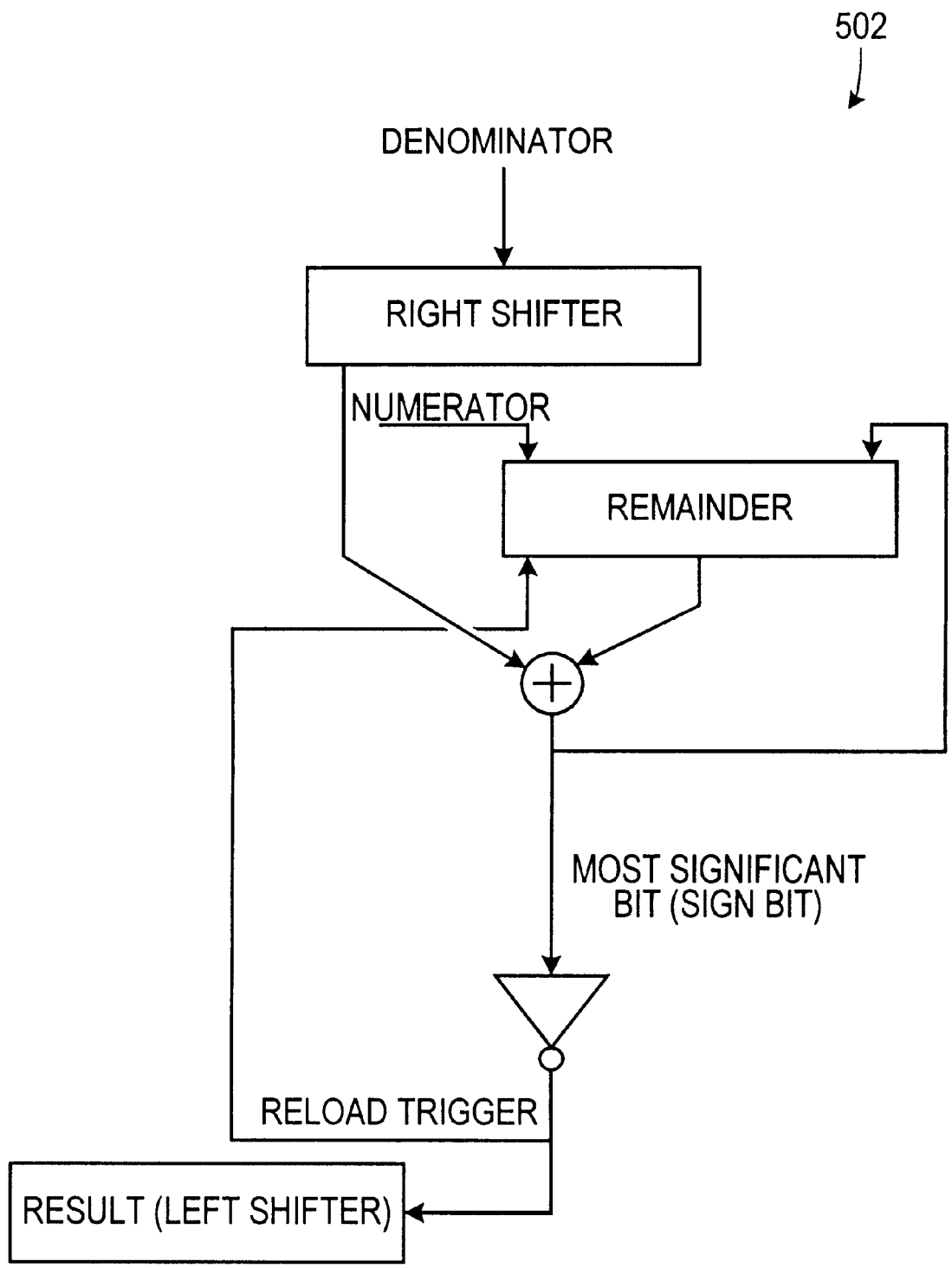
FIG. 5 is a schematic diagram of a serial divider employed in the embodiment of FIG. 1.

A first feedback circuit 130, that is responsive to the band-limited signal, includes a root-mean-squared (RMS) level detector and generates the first feedback signal indicative of an amplitude of the band-limited signal (In one embodiment, the RMS level detector includes a positive square root finder 430, as shown in FIG. 4.) The first feedback circuit 130 also includes a band pass filter that passes signals in a relatively higher frequency range. In the disclosed embodiment, this filter passes frequencies around 11 KHz. A second feedback circuit 132, responsive to the band-limited signal, generates the coefficient feedback signal based on the band-limited signal. The second feedback circuit 132 also includes an RMS level detector and a band pass filter that passes lower frequencies. In the disclosed embodiment, this frequency range is between approximately 30 Hz and 3000 Hz. The second feed back circuit 132 also employs a divider 502 (as shown in FIG. 5) to generate a reciprocal signal value.

The overall design strategy of the circuit disclosed includes: limiting output bandwidth to 13 KHz to simplify filter requirements; employing linear interpolation to two times the input sampling frequency before pre-emphasis; employing linear interpolation to four times the input sampling frequency, $F_S$, before bandwidth-limit filter; allowing the bandwidth limit filter to remove residual images from the interpolation; using the digital phase locked loop 140 to create sinusoidal $F_H$ and $2 F_H$ at $4 F_S$; and modulating the left and right components of the audio signal by $2 F_H$ and inserting the $F_H$ pilot digitally. All of this is embodied on an application specific integrated circuit to reduce costs.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A BTSC-compatible encoder, comprising:
   a. an application specific integrated circuit;
   b. a low pass filter, integrated into the application specific integrated circuit, that is responsive to a digital representation of an audio signal having a sample rate of $F_S$, wherein the low pass filter generates a corresponding second digital signal having an pseudo-interpolated sampling rate of $4 F_S$;
   c. a digital infinite impulse response pre-emphasis filter, integrated onto the application specific integrated circuit, that generates a pre-emphasized output signal corresponding to the second digital signal;
   d. a digital signal compressor, integrated onto the application specific integrated circuit and responsive to the pre-emphasized output signal, that generates a compressed digital signal corresponding to the pre-emphasized output signal;
   e. a digital phase locked loop, integrated onto the application specific integrated circuit and responsive to a video horizontal sync pulse having a sync pulse frequency, that generates a third digital signal corresponding to a sinusoid having a frequency equal to twice the sync pulse frequency and a having a sampling frequency equal to $4F_S$; and
   f. a first digital multiplier, integrated onto the application specific integrated circuit, that multiplies the compressed digital signal by the third digital signal, thereby generating a digital BTSC-compatible stereo television difference signal.

2. The BTSC-compatible encoder of claim 1, wherein the compressor comprises:
   a. a second digital multiplier that multiplies the pre-emphasized output signal by a first feedback signal, thereby generating a digital feedback-multiplied signal;
   b. an infinite impulse response variable coefficient compressor, responsive to the feedback-multiplied signal and responsive to a digital coefficient feedback signal, that generates a digital dynamic range-limited signal corresponding to the feedback-multiplied signal limited to a predetermined dynamic range;
   c. a saturation logic circuit that generates a digital amplitude-limited signal corresponding to the digital dynamic range-limited signal limited to a predetermined amplitude range;
   d. a digital band-limited infinite impulse response low pass filter, responsive to the amplitude-limited signal, that generates a digital band-limited signal corresponding to the amplitude-limited signal;
   e. a first feedback circuit, responsive to the band-limited signal, that includes a root-mean-squared level detector and that generates the first feedback signal indicative of an amplitude of the band-limited signal; and
   f. a second feedback circuit, responsive to the band-limited signal, that generates the coefficient feedback signal based on the band-limited signal.

3. The BTSC-compatible encoder of claim 1, wherein the audio signal includes both left and right components.

4. The BTSC-compatible encoder of claim 1, wherein the audio signal includes both sum and difference components.

* * * * *